(12) United States Patent
Wietfeld et al.

(10) Patent No.: US 9,374,378 B2
(45) Date of Patent: Jun. 21, 2016

(54) ACCESS METHOD AND COMMUNICATION SYSTEM FOR ACCESSING A PROTECTED COMMUNICATION SERVICE

(75) Inventors: Christian Wietfeld, Dortmund (DE); Mohamad Sbeiti, Bochum (DE); Sebastian Subik, Dortmund (DE); Andreas Wolff, Essen (DE)

(73) Assignee: TECHNISCHE UNIVERSITÄT DORTMUND (DE)

( * ) Notice: Subject to any disclaimer, the term of this patent is extended or adjusted under 35 U.S.C. 154(b) by 0 days.

(21) Appl. No.: 14/349,088

(22) PCT Filed: Oct. 19, 2011

(86) PCT No.: PCT/EP2011/068282
§ 371 (c)(1),
(2), (4) Date: Apr. 2, 2014

(87) PCT Pub. No.: WO2013/056737
PCT Pub. Date: Apr. 25, 2013

(65) Prior Publication Data
US 2014/0282953 A1 Sep. 18, 2014

(51) Int. Cl.
*H04L 29/06* (2006.01)
*H04L 9/08* (2006.01)

(52) U.S. Cl.
CPC ............ *H04L 63/104* (2013.01); *H04L 9/0836* (2013.01); *H04L 63/065* (2013.01)

(58) Field of Classification Search
CPC .... H04L 63/104; H04L 63/065; H04L 9/0836
See application file for complete search history.

(56) References Cited

U.S. PATENT DOCUMENTS

| 4,817,190 | A | * | 3/1989 | Comroe et al. | ............... 455/11.1 |
| 5,371,900 | A | * | 12/1994 | Bar-On et al. | ................ 455/508 |

(Continued)

FOREIGN PATENT DOCUMENTS

WO  WO2009/089908  *  7/2009  ............... H04Q 7/28

OTHER PUBLICATIONS

Motorola, et al. "Group Regrouping PTT Requests based on TMSS Setting for Selectable Talkgroups," Published on IP.com on Jul. 16, 2002, Retrieved on Jun. 11, 2015.*

(Continued)

*Primary Examiner* — Robert Leung
(74) *Attorney, Agent, or Firm* — Schmeiser, Olsen & Watts, LLP

(57) ABSTRACT

An access method for accessing a protected communication service via a public communication network by using a secure communication network, whereby the secure communication network is based on user groups, including defining an access group having access to the communication service based on the user groups of the secure communication network, generating a group key for all members of the access group, providing the group key to a member of the access group via the secure communication network, and accessing the communication service via the public communication network using the group key, is provided. A communication system including a secure communication network based on user groups, a public communication network, a protected communication service, and an access server for managing access rights to the communication service, whereby the communication system implements the above method is further provided.

13 Claims, 2 Drawing Sheets

(56) References Cited

U.S. PATENT DOCUMENTS

Figure 1:
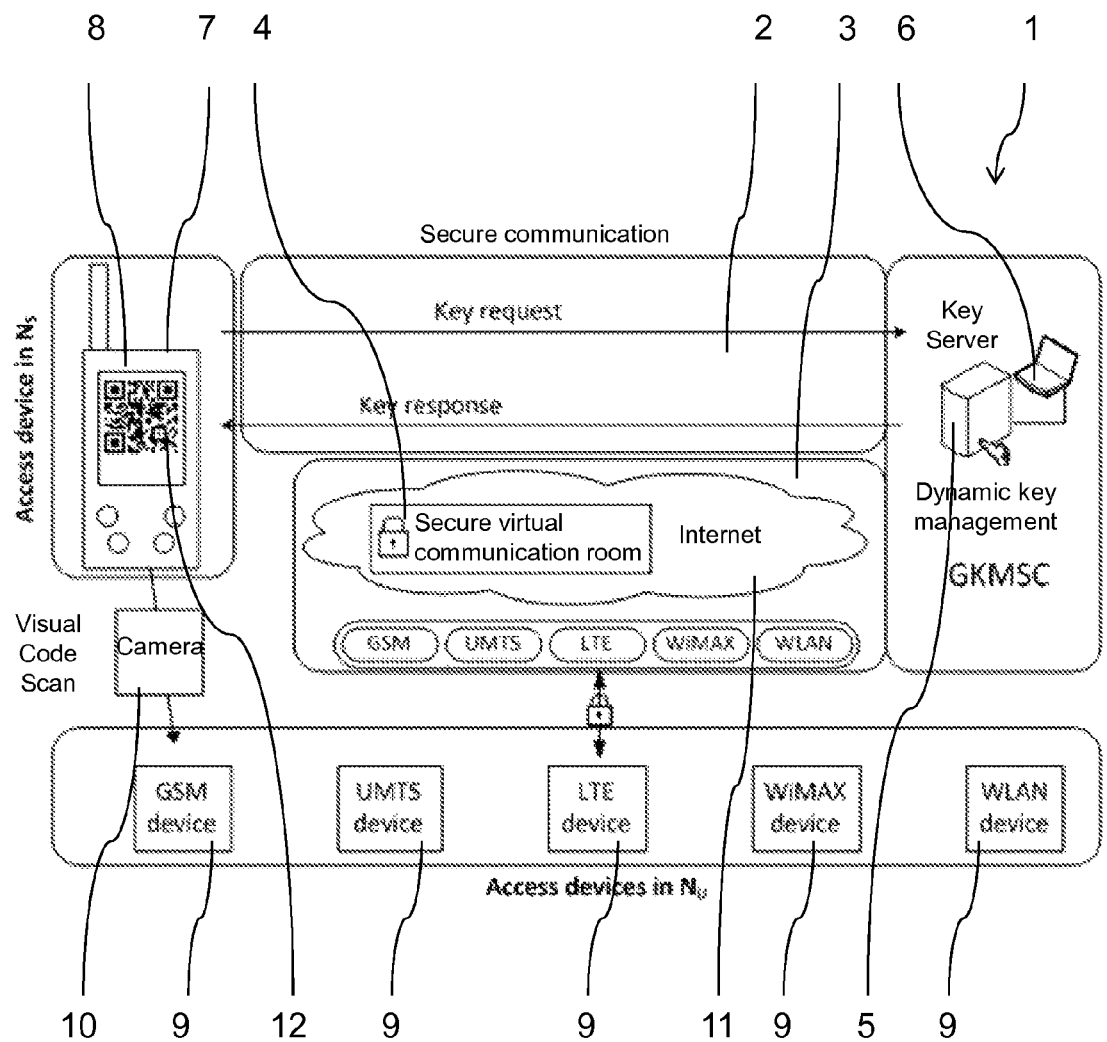

| | | |
|---|---|---|
| 6,195,751 B1 | 2/2001 | Caronni et al. |
| 2002/0154781 A1 | 10/2002 | Sowa et al. |
| 2003/0235309 A1* | 12/2003 | Struik et al. .............. 380/278 |
| 2006/0056635 A1 | 3/2006 | Pappas et al. |
| 2007/0239824 A1* | 10/2007 | Shaffer ............ H04L 29/06027 709/204 |
| 2007/0281724 A1* | 12/2007 | Isobe ............... H04L 12/1822 455/518 |
| 2008/0022089 A1 | 1/2008 | Leedom |
| 2008/0101611 A1 | 5/2008 | Lindholm et al. |
| 2008/0240446 A1 | 10/2008 | Long et al. |
| 2010/0259549 A1* | 10/2010 | Brown et al. ................ 345/589 |

OTHER PUBLICATIONS

PCT/EP2011/068282—International File Date: Oct. 19, 2011—International Search Report and Written Opinion; Technische Universitat Dortmund; 9 pgs.

* cited by examiner

ACCESS METHOD AND COMMUNICATION SYSTEM FOR ACCESSING A PROTECTED COMMUNICATION SERVICE

CROSS-REFERENCE TO RELATED APPLICATIONS

This application claims priority to PCT/EP2011/068282, filed on Oct. 19, 2011, the entire contents of which are hereby incorporated by reference.

FIELD OF TECHNOLOGY

The present invention relates to an access method for accessing a protected communication service via a public communication network by means of a secure communication network, whereby the secure communication network is based on user groups. The present invention further relates to a communication system adapted to execute the above method.

BACKGROUND

Secure communication in nowadays communication networks is becoming more and more important. For example, authority and organizations having security related duties, government agencies, services like police, fire departments and ambulances and others, generally referred to in this application as emergency services, require a reliable and a protected communication system, which provides secure communications for all members of this communication network. Such a communication network is for example known in Germany as BOS-network. This network provides authentication of its members and encryption means, so that the communication is protected from access by third parties. This network is based on the TETRA system, which is a professional mobile radio and 2-way transceiver, also known as walkie talkie or push-to-talk service, and was specifically designed for use by emergency services. Although TETRA is very suitable for voice communication, data rates are limited to approximately 10 Kbit/s. This makes it impossible to use TETRA to transfer huge amounts of data, which are required e.g. for providing multimedia information like pictures, videos or others, which can facilitate the work of the users of the BOS network. Attempts to increase data rates are being made with specification version two of the TETRA standard, but nevertheless data rates are still not sufficient for the aforementioned applications and use cases.

Secure communication networks like TETRA do not only provide authentication and encryption means for communication, but also provide a user structure based on user groups to control the access to the TETRA network. The user groups can be formed to enable simple and quick communication between all user group members. The group structure is typically a hierarchically organized group structure, e.g. with user groups for the different emergency services, which have each on top an officer in charge, who is responsible for a group of squad leaders, which are the heads of individual squads with the different individual persons. The group structure allows enabling a hierarchical communication, so that a communication within one group can be extended within the hierarchy to members of upper and/or lower hierarchy levels. In case of local emergency situations, e.g. a traffic accident, requiring cooperation of different emergency services, e.g. police, fire brigade and ambulance, user groups of the different emergency services can be enabled to inter-communicate with each other, particularly user groups which are located within a local area. Also data communication within the user groups can be provided upon requirements of the emergency situation, including access to a protected database, and to improve the coordination between the different services. For example local maps covering the emergency situation can be provided to involved user groups.

Apart from such secure communication networks, public communication networks are known, which usually provide an IP-based communication with very high data rates compared to the TETRA standard, even compared to TETRA version two. IP-based communication allows any kind of communication, e.g. VoIP, multimedia services, data communication or others. The public communication networks can be based on different communication standards, like GSM/GPRS, UMTS, LTE, WiMAX or wireless LAN (W-LAN). Nevertheless, these public communication networks are not suitable for secure communication from user to user. Even in networks providing authentication and encryption means, network keys are not under control of the users who require a secure communication and are therefore potentially accessible by third parties. Even when using special user keys for enabling point-to-point encryption between a user and a communication service or between two users, keys have to be transmitted via the public communication network prior to enabling encryption. Accordingly, these keys are therefore potentially accessible by third parties.

Emergency services sometimes are equipped with means for providing access to a protected communication service. This communication service is under control of the respective emergency service and therefore allows secure communication. E.g. the emergency service can provide a proper WLAN access point to be used of all members of the respective emergency service to provide locally in an area of an emergency situation a protected communication service with high bandwidth. Nevertheless, in emergency situations it can be required to share communication and/or information of a particular database with members of others emergency services to improve the coordination of the different emergency services and to resolve the emergency situation as quick as possible. This is almost impossible with such communication services under control of an individual emergency service.

SUMMARY

It is an aspect of the present invention to provide an access method and a communication system for accessing a protected communication service, which enables high data rates suitable for multimedia applications, full protection of transmitted information, and which allows simple and quick managing of members of this communication service.

This aspect is achieved by the independent claims. Advantageous embodiments are given in the dependent claims.

In particular, the present invention provides an access method for accessing a protected communication service via a public communication network by means of a secure communication network, whereby the secure communication network is based on user groups, comprising the steps of defining an access group having access to the communication service based on the user groups of the secure communication network, generating a group key for all members of the access group, providing the group key to a member of the access group via the secure communication network, and accessing the communication service via the public communication network using the group key.

The present invention further provides a communication system comprising a secure communication network based on user groups, a public communication network, a protected communication service, an access server for managing access rights to the communication service, whereby the communication system is adapted to execute the aforementioned method.

Basic idea of the invention is to use the secure communication network for transmitting the group key, which can be used for accessing the protected communication service. Since the transmission of the group key over the secure communication network is protected from third parties, the group key is suitable for establishing a secure connection to the communication service over the public communication network. The access group is based on the user groups of the secure communication network, so that the access group can easily be formed and provide access to the protected communication service in short time. The access server is responsible for generating the group key and providing the group key to the member of the access group. The access server additionally provides the information to the communication service. The communication service is usually provided on any kind of communication server, also depending on the kind of communication service provided. The access to the protected communication service with the group key can be easily verified by the single group key. The group key is easy to handle, since it is a common key for all members of the access group. Also communication services can be easily added by simply generating the single group key, e.g. when communication services are locally installed by emergency services. The group key is generated on the access server and provided from the access server via the secure communication network to the member of the access group. Alternatively, the group key is administered by a third party, e.g. by the communication service itself, and transferred to the access server, which combines the group key with the access group and transfers the group key to all members of the access group. In a further embodiment of the invention, the group key is provided from the third party to the member of the access group upon request from the access server. The access server is controlled by a terminal, which is a remote terminal, for managing the access server from any location, to allow a flexible generation on a short term bases of the group key. Even more, the remote terminal uses a secure connection of the secure communication network. This allows e.g. a squad lead in a local emergency situation to provide access to the protected communication service to all user groups involved in the emergency situation.

In an exemplary embodiment of the invention the group key is provided to the member of the access group upon a user request via the secure communication network. Accordingly, members of the access group, who have the need for accessing the protected communication service express this need by a request for receiving the group key and can easily access the communication service. Other members of the access group, which have no need to access the communication service, will not be bothered with a transmission of the group key. In this case, the group key will usually be provided to a limited number of members of the access group, so that the group key is not widely spread over all members of the access group.

In an exemplary embodiment of the invention the group key is provided to the member of the access group by a push service. The push service can be started instantaneously when the access group is created, or at any time after creation of the access group. A push service refers to the provisioning of the group key to all members of the access group without prior requests for receiving the group key. Also combined methods for providing the group key to members of the access group are possible, e.g. the group key can be provided to some members of the access group by means of the push service and to other members of the access group only upon request via the secure communication network.

In an exemplary embodiment of the invention the step of accessing the communication service via the public communication network using the group key comprises establishing a secure connection over the public communication network. Secure connection refers to a connection which uses end-to-end encryption from the member of the access group to the communication service, so that all traffic is securely protected from third parties even in public communication networks. The secure connection has a security level depending on characteristics of the group key, in particular depending on the length of the group key, so that a desired security level can be chosen depending on the size of the group key.

In an exemplary embodiment of the invention the step of defining an access group having access to the communication service based on the user groups of the secure communication network comprises the step of adding a user group to the access group. Accordingly, an initially formed access group can be amplified at any time, e.g. when additional emergency services are required, which have not been involved right from the beginning, a user group pertaining to this emergency service can be added to the access group. In an analogue manner it is of course possible to remove members from the access group, e.g. when they are no longer involved in the emergency situation.

In an exemplary embodiment of the invention the user groups have a hierarchical structure and the step of adding a user group to the access group comprises adding the user group and all user sub-groups, which are hierarchically below the added user group. This allows forming an access group with a large number of members easily and in short time. E.g. an emergency situation on national level can be handled by forming an access group including all available emergency services by adding their heads, whereas a local emergency situation can be handled on a lower hierarchy level, e.g. by involving emergency squads and their squad leads of different emergency services in this local area only. By adding e.g. a squad leader to the access group, all squad members are automatically added to this access group.

In an exemplary embodiment of the invention the step of providing the group key to a member of the access group via the secure communication network comprises providing the group key to a first communication device for use in the secure communication network, and the step of accessing the communication service via the public communication network using the group key comprises accessing the communication service from a second communication device for use in the public communication network, comprising the step of transferring the group key from the first communication device to the second communication device. Secure communication networks frequent focus on voice communication and are not optimized for IP communication and accessing a database and the output of multimedia information. Such first communication devices sometimes lack possibilities to connect to a public communication network. In other cases, the first communication devices are not suitable for a special purpose, e.g. when information has to be processed in a certain manner or the output of information is required in a suitable manner, e.g. requiring a large display for showing details in a map. Accordingly, it is required to transfer the group key from the first communication device to the second communication device, which enables access to the communication service from this second communication device. Since the first communication device and the second communication device are under control of a unique member of the access group, the group key is only provided to an authorized person. By being independent from the access to the secure communication network, any suitable communication device can be used as second communication device, so that any particular requirement for use of data provided via the communication service can be easily fulfilled. Also, second communication devices for use in public networks are widely available, so that they can be provided at low costs.

In an exemplary embodiment of the invention the step of transferring the group key from the first communication device to the second communication device comprises displaying a visualization of the group key at the first communication device, and recognizing the group key from the visualization at the second communication device. Preferably, the group key is shown on a display of the first communication device. Many kinds of second communication devices are already provided with a built-in camera, which can be used for recognizing the visualization of the group key, e.g. any kind of mobile phone, smartphones, notebooks or any other kind of mobile computers. If not already available, also external cameras can be connected to the second communication device by means of widely used interfaces, e.g. USB. The use of the visualization of the group key and the automatic recognition by means of the camera in the second communication device, allows passing the group key easily from the first to the second communication device. Any key size for the group key can be chosen, depending only on security requirements, since even long group keys can be easily passed from the first to the second communication device, which in case of manual passing of the group key is faulty and time-consuming and requires high attention of the user.

In an exemplary embodiment of the invention the step of displaying a visualization of the group key at the first communication device comprises displaying a bar code representing the group key, and recognizing the group key from the visualization at the second communication device comprises reading the bar code. Bar codes of different kinds are known, e.g. linear bar codes or two-dimensional matrix bar codes. Bar codes can use different coding schemes, which is not relevant as long as first and second communication devices for using the same coding and bar code type for transferring the group key. Bar codes provide a robust and simple means for transferring the group key, since they are suitable for automatic recognition by a camera or a particular bar code reader. When a high security level is required and the length of the group key is high, preferably a matrix bar code is chosen which allows visualizing a high amount of information.

An exemplary embodiment of the invention comprises the steps of deleting the group key and generating a modified group key for the access group, providing the modified group key to a member of the access group via the secure communication network, and accessing the communication service via the public communication network using the modified group key. Accordingly, access rights to the protected communication service can be granted and removed upon requirements of the emergency situation and also under consideration of security aspects. In cases the emergency situation requires or allows to remove a user group from the access group, this can be easily realized by forming a new access group, generating the modified group key for this new access group, invalidating the former group key, and enabling all members of the modified access group to access the communication service with the modified group key. Also in case a second communication device, which is enabled to access the communication service via the public communication network, is lost, security of the access to the communication service can be maintained by simply deleting the present group key and generating a modified group key. Accordingly, a communication device accessing the communication service requires the modified group key, which can only be provided by transferring the group key via the secure communication network. Accordingly, the security level of the access to the communication service via the secure communication network is identical to the security level of the secure communication network.

In an exemplary embodiment of the invention the step of defining an access group having access to the communication service comprises providing a database within the communication service, and the step of accessing the communication service comprises accessing the database. This allows restricted access to the database depending on the particular emergency situation in accordance with the access rights granted by the group key to all members of an access group. Also different emergency services can provide their individual databases, which are commonly accessed by means of the secure connection with the public network, so that a unique interface for accessing the database can be used. Portions of the database, which are not relevant in the emergency situation, can be excluded from the access by the members of the access group. The control of the portions of the database to be accessed by the members of the access group is implemented on the access server. Furthermore, different access groups can be formed for accessing different portions of the database, e.g. in the case of different simultaneous emergency situations.

In an exemplary embodiment of the invention the step of defining an access group having access to a communication service is performed at least twice for individual communication services, whereby at least one member of the access group for one communication service is also member of the access group for another communication service. This enables a member or a group of members of the access group to be also member of a further access group where required. E.g. supervisors can be members of multiple access groups to get an overview over all current emergency situations, so that they can for example perform a resource planning and activate further personnel of an emergency service.

In an exemplary embodiment of the invention the communication service is connected to the secure communication network, and the step of accessing the communication service via the public communication network comprises using the group key comprises establishing a communication to a member or a user group of the secure communication network. The connection of the communication service to the secure communication network enables a wide range of possibilities for communication to facilitate the work of the members of the access group.

In an exemplary embodiment of the invention the step of defining an access group having access to the communication service based on the user groups of the secure communication network comprises the step of mapping an already existing communication group of the secure communication network to the access group. In case a communication group has already been formed in the secure communication network, the access group is simply formed by copying this access structure. The communication group comprises a single user group or multiple different user groups.

In an exemplary embodiment of the invention the step of mapping an already existing communication group of the secure communication network to the access group comprises performing a 1:1, a n:1 or a 1:n mapping between already existing communication groups and access groups. The 1:1 mapping refers to a mapping, where existing communication groups, which comprise one or multiple user groups of the secure communication network, are mapped each to one access group. Accordingly, all users of the communication group will be granted access to the protected communication service 4 via the secure communication network 2. According to the n:1 mapping, a single group key is provided to an access group comprising different communication groups of the secure communication network. Accordingly, the access group can comprise user groups of different emergency services and combines user groups independently from any group structure of the secure communication network. The 1:n mapping refers to a mapping, where a communication group of the secure communication network 2 is a member of different access groups as. Accordingly, members of these communication groups are enabled to participate in different communication services.

BRIEF DESCRIPTION

Figure 2:
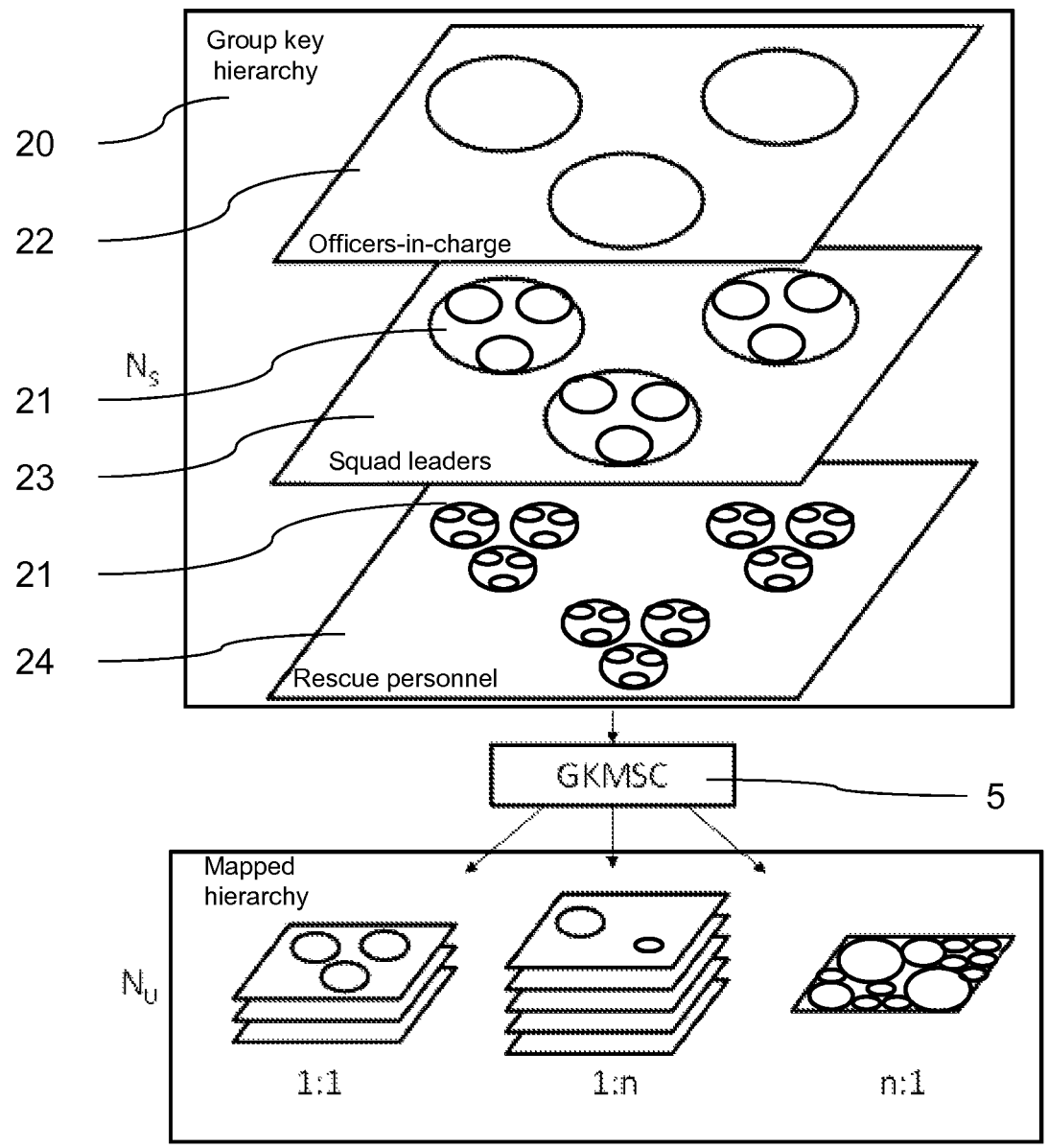

These and other aspects of the invention will be apparent from and elucidated with reference to the embodiments described hereinafter in respect to the drawings. In the drawings:

FIG. 1 is a schematical overview of a communication system according to an embodiment of the present invention; and FIG. 2 is a schematical overview of a group structure of a secure communication network and its mapping to an access group for accessing a protected communication service via a public communication network.

DETAILED DESCRIPTION

FIG. 1 shows a schematical overview of a communication system 1 according to an embodiment of the invention. The communication system 1 comprises a secure communication network 2 and a public communication network 3 which are only schematically shown. The secure communication network 2 in this embodiment is a BOS-network according to the TETRA-standard.

The communication system 1 further comprises a protected communication service 4, which is referred to as a secure virtual communication room in FIG. 1. The secure communication network 2 and the public communication network 3 are both connected to an access server 5, also denoted Group Key Management Service Center (GKMSC), which is also part of the communication system 1, and which is administered via a remote terminal 6. Although the remote terminal 6 is in FIG. 1 shown as directly connected to the access server 5, the remote terminal 6 can be connected via any kind of network connection for managing the access server 5 from any place.

The communication system 1 further comprises secure communication devices 7 for communicating via the secure communication network 2, which are a first communication device according to the invention. The secure communication device 7 is a mobile phone having a display 8 for displaying information. The communication system 1 further comprises at least a second communication device 9 for use in the public communication network 3. The second communication device 9 can be a communication device according to any suitable public communication network, e.g. a GSM device, a UMTS device, a LTE device, a WiMAX device or a wireless LAN device. The choice of the second communication device or devices only depends on available public communication network access. As indicated by camera 10, each of the second communication devices 9 comprises such a camera 10 or is connectable to the camera 10. The second communication devices can be any kind of suitable communication devices, e.g. mobile phones, smartphones, mobile computers or dedicated communication devices for particular use, e.g. for particular use by emergency services. For reasons of simplicity, only one first and one second communication device 7, 9 are shown in FIG. 1.

The protected communication service 4 is in communication connection with the public communication network 3 by means of any kind of suitable connection. This is indicated by placing the communication service 4 within a cloud 11 representing the internet. The protected communication service 4 is in this embodiment indicated by a single instance. Nevertheless, the protected communication service 4 can comprise multiple separated communication services 4 and can include any kind of database, e.g. a database having different locally distributed individual servers for hosting portions of the database, which have a common access interface and appears to a user as a unique database.

FIG. 2 shows in the upper part a hierarchical structure 20 of different user groups 21. In this exemplary embodiment of the invention, the first hierarchy level 22 comprises a unique user group 21 of officers in charge, which are the heads of individual emergency services. On a second hierarchy level 23, which is a squad leader level, each of the emergency services provides a squad leader group with three squad leaders. On the third hierarchy level 24, the user groups 21 are formed by the rescue personnel. Accordingly, each squad leader is associated with a user group 21 of rescue personal having a number of rescue persons. This hierarchical structure 20 provides individual group access rights to the secure communication network 2, e.g. for communication within a user group 21.

The method for accessing the protected communication service 4 will now be described. First, an access group having access to the protected communication service 4 is defined based on user groups of the secure communication network 2. In this embodiment, the hierarchy structure 20 of the secure communication network 2 is mapped to form an access group in accordance with a communication group as already established in the secure communication network 2. The communication group comprises a single user group 21 or multiple different user groups 21. Furthermore, a user group 21 is added to the access group.

Based on this access group, a group key is generated for all members of the access group. The group key is generated also by the access server and is a unique key for all members of the access group.

Next, the group key is provided to a member of the access group via the secure communication network 2. As shown in FIG. 1, the member of the access group sends a key request from the secure communication device 7 via the secure communication network 2 to the access server 5. The access server 5 verifies the key request and, in case of successful verification, provides the group key in a key response message via the secure communication network 2 to the secure communication device 7.

The group key is then transferred from the secure communication device 7 to the second communication device 9. Accordingly, a visualization of the group key is shown on the display 8 of the secure communication device 7 by means of a bar code 12, which this exemplary embodiment of the invention a matrix bar code, as indicated on the display 8 of the secure communication device 7. The second communication device 9, which requires access to the protected communication service 4, reads via the camera 10 the bar code 12 from the display 8 of the secure communication device 7 and recognizes the group key.

The second communication device 9 now connects via the public communication network 3 to the protected communication service 4 using the group key. The connection from the second communication device 9 to the protected communication service 4 is established as a secure connection using authentication and encryption based on the group key.

The assignment of the group key by the access server 5 is highly dynamical, where the group keys can be generated, removed or assigned at any time. E.g. an existing access group can be modified by adding or removing a user group 21 at any time. Since the user groups 21 are provided in the hierarchical structure 20, adding or removing a user group 21 can involve adding all sub-groups, which are hierarchically below the added user group 21. The group key can then be provided as described above to any new member of the access group.

Since the group key is a unique key for all members of the access group, removing members from the access group requires substituting the current group key. Accordingly, the current group key is deleted and a modified group key for the modified access group is generated. Members of the access group, which have already requested and received the group key earlier, as described above, are provided with the modified group key via the secure communication network 2 by a push service, so that these members of the access group will receive the modified group key without additional request to the access server 5. The modified group key can be transferred to the respective second communication device 9 as described above and allows access to the protected communication service 4 via the public communication network 3 as described above. In an alternative embodiment of the invention, the modified group key is provided only upon request to the members of the access group.

Although the protected communication service 4 has so far only been described as a single communication service 4, in a modified embodiment of the invention multiple communication services 4 with independent access groups are defined. Accordingly, independent communication can be established via the respective communication service 4. The communication service 4 also comprises a database for access by members of the access group. Different access groups can have access to different portions of the database.

As shown in FIG. 2, user group management provides simple means for granting access to the communication service 4 when based on the hierarchical structure 20 of the user groups 21 of the secure communication network 2. Different kinds of mapping are possible and will be described below. One possibility is to perform a 1:1 mapping of the hierarchical structure 20 of the secure communication network 2, where existing user groups 21 or communication groups comprising multiple user groups 21 of the secure communication network 2 are mapped to the access group or access groups. Accordingly, all users of the communication group will be granted access to the protected communication service 4 via the secure communication network 2.

Another possibility is a n:1 mapping, where a single group key is provided to an access group comprising different individual communication groups of the secure communication network 2. Accordingly, the access group can comprise user groups 21 of different emergency services and combine user groups outside the hierarchical structure 20 of the secure communication network 2.

A further possibility for a mapping is a 1:n mapping, where a communication group of the secure communication network 2 is a member of different access groups as described above. Accordingly, members of these groups are enabled to participate in different communication services 4.

The invention claimed is:

1. An access method for accessing a protected communication service via a public communication network by means of a secure communication network, whereby the secure communication network is based on user groups, comprising the steps of:
   defining an access group having access to the communication service based on the user groups of the secure communication network;
   generating a group key for all members of the access group;
   providing the group key to a member of the access group via the secure communication network; and
   accessing the protected communication service via the public communication network using the group key;
   wherein the step of defining an access group having access to the communication service based on the user groups of the secure communication network comprises the step of adding a user group to the access group;
   wherein the user groups have a hierarchical structure and the step of adding a user group to the access group comprises adding the user group and all user sub-groups, which are hierarchically below the added user group.

2. The method according to claim 1, further comprising:
   the group key is provided to the member of the access group upon a user request via the secure communication network.

3. The method according to claim 1, further comprising:
   the group key is provided to the member of the access group by a push service.

4. The Method according to claim 1, wherein the step of accessing the communication service via the public communication network using the group key comprises establishing a secure connection over the public communication network.

5. The method according to claim 1, wherein the step of providing the group key to a member of the access group via the secure communication network comprises providing the group key to a first communication device for use in the secure communication network, and
   the step of accessing the communication service via the public communication network using the group key comprises accessing the communication service from a second communication device for use in the public communication network,
   comprising the step of
   transferring the group key from the first communication device to the second communication device.

6. The method according to claim 5, wherein the step of transferring the group key from the first communication device to the second communication device comprises:
   displaying a visualization of the group key at the first communication device, and
   recognizing the group key from the visualization at the second communication device.

7. The method according to claim 6, wherein the step of displaying a visualization of the group key at the first communication device comprises displaying a bar code representing the group key, and
   recognizing the group key from the visualization at the second communication device comprises reading the bar code.

8. The method according to claim 1, further comprising the steps of
   deleting the group key and generating a modified group key for the access group,
   providing the modified group key to a member of the access group via the secure communication network, and accessing the communication service via the public communication network using the modified group key.

9. The method according to claim 1, wherein the step of defining an access group having access to the communication service comprises providing a database within the communication service, and the step of accessing the communication service comprises accessing the database.

10. The method according to claim 6, wherein the step of defining an access group having access to a communication service is performed at least twice for individual communication services, whereby at least one member of the access group for one communication service is also member of the access group for another communication service.

11. The method according to claim 1, wherein the communication service is connected to the secure communication network, and the step of accessing the communication service via the public communication network comprises using the group key comprises establishing a communication to a member or a user group of the secure communication network.

12. The method according to claim 1, wherein the step of defining an access group having access to the communication service based on the user groups of the secure communication network comprises the step of mapping an already existing communication group of the secure communication network to the access group.

13. The method according to claim 12, wherein the step of mapping an already existing communication group of the secure communication network to the access group comprises performing a 1:1, a n:1 or a 1:n mapping between already existing communication groups and access groups.

* * * * *